April 13, 1954 W. C. MAGNUSON ET AL 2,674,858
APPARATUS FOR PRODUCING CLEAR ICE CUBES
Filed July 26, 1950
2 Sheets-Sheet 1
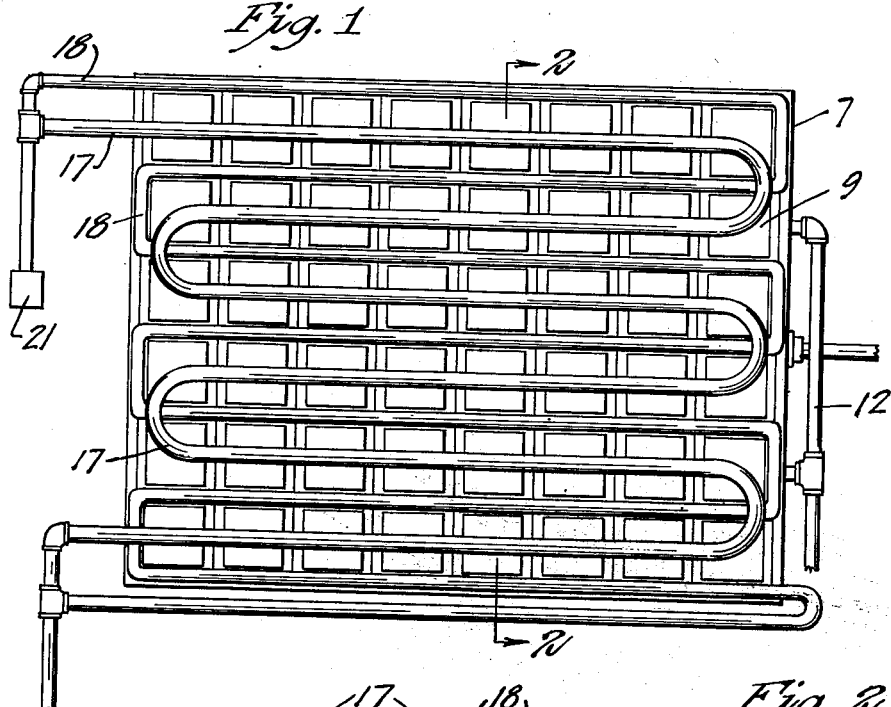
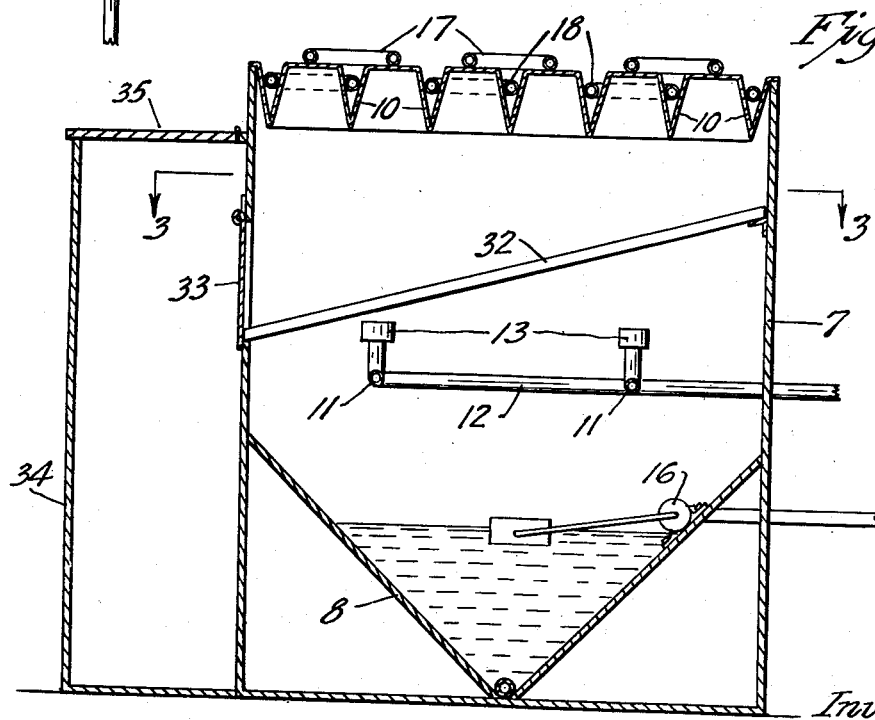
Inventors
ANTHONY D. PALCICH
CHESTER A. WESEMAN
WILLARD C. MAGNUSON
By Williamson & Williamson
Attorneys April 13, 1954 W. C. MAGNUSON ET AL 2,674,858
APPARATUS FOR PRODUCING CLEAR ICE CUBES
Filed July 26, 1950 2 Sheets-Sheet 2
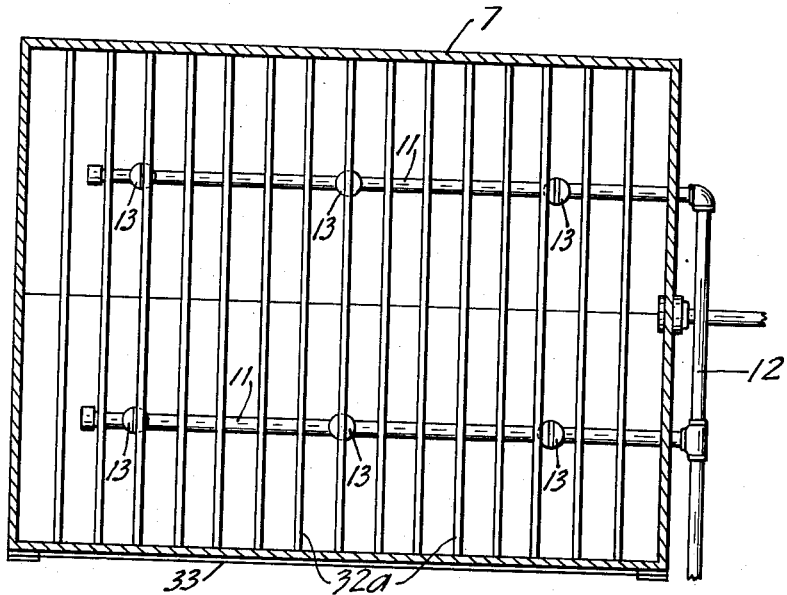
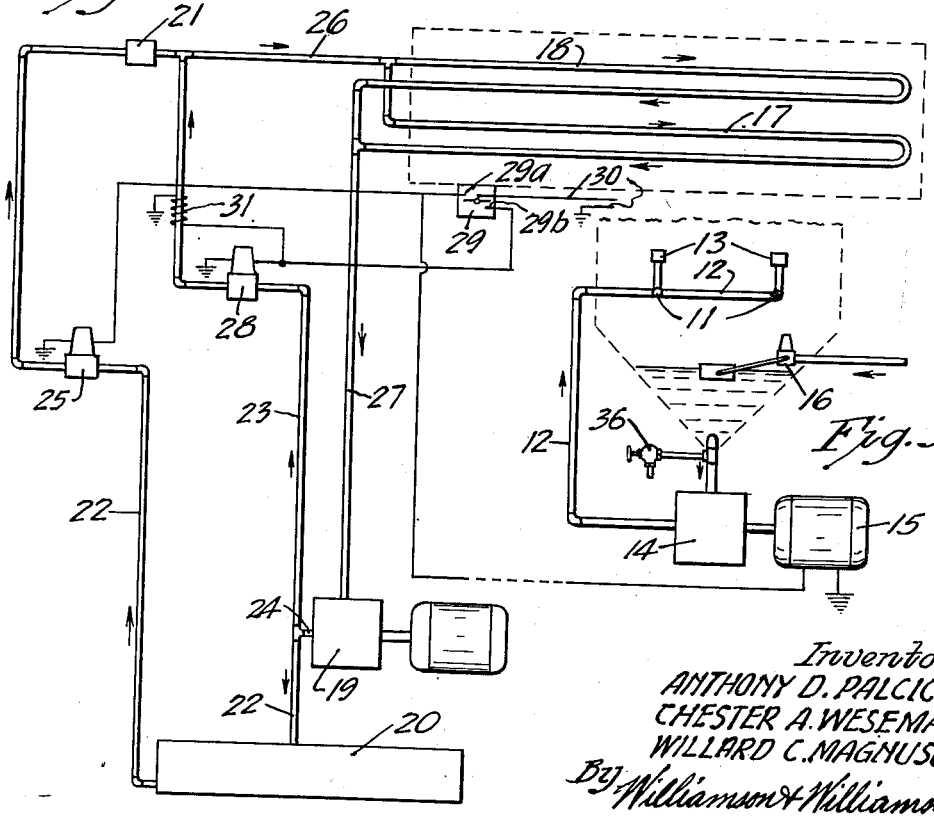
Inventors
ANTHONY D. PALCICH
CHESTER A. WESEMAN
WILLARD C. MAGNUSON
By Williamson & Williamson
Attorneys Patented Apr. 13, 1954

2,674,858

UNITED STATES PATENT OFFICE 2,674,858

APPARATUS FOR PRODUCING CLEAR ICE CUBES

Willard C. Magnuson, St. Paul, and Anthony D. Palcich and Chester A. Weseman, Austin, Minn.; said Palcich and said Magnuson assignors to said Weseman Application July 26, 1950, Serial No. 175,942

3 Claims. (Cl. 62—3)

This invention relates generally to mechanism for producing ice cubes and particularly to a system constructed to produce and harvest substantially clear cubes.

It has been a problem to produce a relatively inexpensive ice producing machine adapted to produce substantially clear ice cubes and to successfully harvest said cubes.

It is an object of our invention to provide a novel, relatively simple, highly efficient ice cube producing system adapted to freeze substantially clear cubes and to quickly harvest said cubes and collect the same in a suitable storage compartment.

It is another object to provide mechanism for producing substantially clear ice cubes having an inverted mold structure with a number of nozzles positioned thereunder to deliver a spray thereagainst, said mold structure having refrigeration means closely associated therewith and adapted by reverse cycle operation to release the cubes from said mold structure after the same have been frozen.

It is still another object to provide a foraminous chute structure interposed between the spray nozzles and the mold structure to receive the released cubes and deliver the same to a storage compartment.

These and other objects and advantages of our invention will more fully appear from the following description made in connection with the accompanying drawings wherein like reference characters refer to similar parts throughout the several views and in which:

Fig. 1 is a top plan view of the refrigeration system mounted above the mold structure;

Fig. 2 is a vertical sectional view taken substantially along the line 2—2 of Fig. 1;

Fig. 3 is a horizontal sectional view taken substantially along the line 3—3 of Fig. 2;

Fig. 4 is a diagrammatic view of the refrigeration system and controls for operating the same; and Fig. 5 is a diagrammatic view of the water supply system.

As illustrated in the accompanying drawings, we provide a freezing chamber 7 having insulated outside walls and constructed to provide a water confining tank 8 at the bottom thereof. In the form shown, said tank has sloping sides which converge at the bottom thereof. At the top of the compartment 7 is a mold structure 9 having a plurality of inverted molds 10 having closed tops and open bottoms. The bottoms of the molds are substantially smaller than the tops and adjoining sides of adjacent molds are spaced at the tops and converge at the bottoms, as best shown in Figs. 1 and 2.

A water supply system is provided which, in the form shown, has a pair of supply conduits 11 connected to a manifold pipe 12 and having a plurality of upwardly directed spray nozzles 13, as best shown in Figs. 2 and 3. These spray nozzles 13 are adjusted to direct a finely divided spray of water upwardly into the molds 10. A pump 14, best shown in Fig. 5, having a motor 15, is connected to an outlet pipe at the bottom of tank 8 and receives its water therefrom and discharges the water at a predetermined pressure into the manifold pipe 12 to which the conduits 11 are connected. A float valve 16 connected with a suitable source of water supply maintains a substantially constant water level in the tank 8. A refrigeration system having the coils 17 and 18 mounted in close association with the molds 10 is provided and is connected to a suitable compressor 19 having a condenser 20 and expansion valve 21.

The discharge line from the compressor is divided into two branches 22 and 23 by the T 24. The branch 22 runs to the condenser 20 which in the form shown is a liquid cooled condenser and extends from the condenser to the expansion valve through a solenoid valve 25. From the expansion valve 21 the refrigerant line 22 is connected to the coils 17 and 18 by the conduit 26. A suction line 27 is connected to the two coils 17 and 18 and runs to the low side of the compressor 19. The other branch 23 from the high side of the compressor runs to the conduit 26 and is T'd thereto on the low side of the expansion valve 21. A solenoid valve 28 is interposed into the line. A double contact thermostat switch 29 controls the operation of the two solenoid valves 25 and 28 as well as the pump motor 15. Said switch has a pair of contacts 29a and 29b and is thermally connected with the inside of the chamber 7 and is constructed to be responsive for actuation to temperature changes within said chamber. As long as the temperature within the chamber is above a predetermined limit the center contact arm will connect the power source 30 with contact 29a and will hold solenoid valve 25 in open position and will operate the pump motor 15. As soon as the temperature within the freezing compartment falls below a predetermined limit the switch will swing to close the circuit through contact 29b which will close solenoid valve 25 and will open the normally closed solenoid valve 28. This begins the defrost cycle of operation and supplies the hot gas directly from the compressor to the coils 17 and 18. Additional heat is supplied to the hot gas by an electric heating coil 31 which surrounds the hot gas line 23 and is energized when the circuit is closed through contact 29b of the thermostatic switch 29. The direction of the arrows of Fig. 4 shows the flow of refrigerant fluid through the respective lines.

The following is a description of the operation of our ice cube producer. When the pump is operating a finely divided spray of water is discharged from the nozzles 13 and is directed upwardly into the molds 10. The solenoid valve 25 is open and the valve 28 is closed putting the refrigeration system on freezing cycle. As the spray of water strikes the cold molds 10 the ice freezes from the inside of the molds outwardly and the spray of water continuously washes the ice during the freezing thereof to carry off substantially all of the impurities therein, such as air and minerals, which produce the cloudy appearance in conventional ice cubes, to thus produce a substantially clear cube free from said impurities. The two coils 17 and 18 produce efficient cooling of the entire mold structure 9 and the substantially clear ice is formed at a relatively rapid rate. When the ice has been formed the temperature in the freezing compartment will be at a substantially predetermined degree at which time the thermostatic switch 29 is set to shift from one position to the other throwing the system on reverse defrost cycle. This opens the circuit through solenoid valve 25 and pump motor 15 to close the valve 25 and shut off the pump. It simultaneously opens solenoid valve 28 and energizes heating valve 21 to release the cubes from the respective molds 10. The released cubes drop out of the molds onto an inclined foraminous chute 32 which in the form shown is constructed of spaced substantially parallel rods 32a which are interposed between the mold structure 9 and the nozzles 13 and receive the cubes from the molds 10 and deliver the same through a spring closed trap-door 33 formed in the side wall of the compartment. An insulated storage chamber formed by the casing 34 is mounted to receive the cubes through the trap-door 33 and a hinged insulated access top 35 is provided.

It should be noted that as the impurities are removed from the water these impurities will become more and more concentrated in the reservoir tank and therefore a drain 36 is provided to remove the water from the tank, as best shown in Fig. 5.

It will be seen that we have provided a highly efficient fully automatic ice cube producer adapted to produce substantially clear ice cubes by means of an upwardly directed spray into a number of inverted cube molds. When the molds are frozen a relatively simple reverse cycle is produced in the refrigeration system to release the cubes from the molds and an inclined foraminous chute discharges the cubes into the storage chamber 34.

It will, of course, be understood that various changes may be made in the form, details, arrangement and proportions of the parts without departing from the scope of our invention.

What we claim is:

1. Apparatus for producing clear ice bodies comprising a freezing chamber, a mold structure mounted in the upper portion of said chamber, said mold structure including a plurality of closed-topped molds having open bottoms, a number of spray nozzles disposed in spaced relation below said mold structure and constructed to direct a finely divided spray of liquid to be frozen into said molds, a thermostatically controlled refrigeration system including a compressor, a cold refrigerant freezing supply line and a hot refrigerant defrosting supply line, a pair of solenoid valves respectively interposed into said lines, a thermostat responsive for actuation to temperature changes within the freezing chamber and closing one solenoid during the freezing operation and the other solenoid during the defrosting operation, a liquid collection tank disposed below said mold structure, and a pump controlled by said thermostat for supplying liquid under pressure to said nozzles during the freezing cycle only, and means for collecting the cubes released from the molds during the defrosting cycle.

2. Apparatus for producing clear ice bodies comprising a freezing chamber, a mold structure within said chamber, said mold structure having depending side portions, closed top portions and open bottom portions, atomized spray-producing means disposed a substantial distance below the bottom of said mold structure so as to produce a finely divided spray of liquid to be frozen and direct the same upwardly through a substantial air space into said mold structure, an inclined cube-receiving and guiding chute disposed below said mold structure and extending completely thereunder, means for successively freezing liquid in said mold structure and releasing the frozen liquid from said mold structure, said chamber having a cube delivery opening in communication with said chute for receiving cubes released from said mold structure to be delivered out of said chamber.

3. The structure set forth in claim 2, and said inclined cube-receiving and guiding chute being disposed between said mold structure, and said atomized spray-producing means having an open area therein disposed above the atomized spray-producing means to permit said finely divided spray to be directed upwardly through said guiding chute and provide an area of clear and unobstructed fall between the mold structure and the chute to permit unobstructed delivery of the cubes onto the chute and down the inclined surface thereof, the open area in said chute being sufficiently small to prevent the cubes from passing therethrough.

References Cited in the file of this patent

UNITED STATES PATENTS

| Number | Name | Date |
|---|---|---|
| 1,540,040 | Stewart | June 2, 1925 |
| 2,063,770 | Taylor | Dec. 8, 1936 |
| 2,063,771 | Taylor | Dec. 8, 1936 |
| 2,145,774 | Muffly | Jan. 31, 1939 |
| 2,340,721 | Whitney | Feb. 1, 1944 |
| 2,526,379 | Maseritz | Oct. 17, 1950 |
| 2,542,892 | Bayston | Feb. 20, 1951 |
| 2,563,093 | Bayston | Aug. 7, 1951 |
| 2,575,374 | Walsh | Nov. 20, 1951 |
| 2,583,294 | Erickson | Jan. 22, 1952 |